(12) United States Patent
Sanders et al.

(10) Patent No.: US 10,250,388 B2
(45) Date of Patent: Apr. 2, 2019

(54) METHODS, NETWORKS AND NODES FOR DYNAMICALLY ESTABLISHING ENCRYPTED COMMUNICATIONS

(71) Applicant: ARCHITECTURE TECHNOLOGY, INC., Minneapolis, MN (US)

(72) Inventors: Clint M. Sanders, Plymouth, MN (US); Deborah K. Charan, Minneapolis, MN (US); Ranga Sri Ramanujan, Medina, MN (US); Ryan C. Marotz, Bloomington, MN (US)

(*) Notice: Subject to any disclaimer, the term of this patent is extended or adjusted under 35 U.S.C. 154(b) by 204 days.

(21) Appl. No.: 15/213,084

(22) Filed: Jul. 18, 2016

(65) Prior Publication Data

US 2017/0099143 A1    Apr. 6, 2017

Related U.S. Application Data

(63) Continuation of application No. 13/283,162, filed on Oct. 27, 2011, now abandoned.

(51) Int. Cl.
| | |
|---|---|
| *H04L 29/06* | (2006.01) |
| *H04L 9/32* | (2006.01) |
| *H04L 9/08* | (2006.01) |
| *H04L 9/16* | (2006.01) |
| *H04L 9/14* | (2006.01) |

(52) U.S. Cl.
CPC ............ *H04L 9/32* (2013.01); *H04L 9/0847* (2013.01); *H04L 9/0861* (2013.01); *H04L 9/14* (2013.01); *H04L 9/16* (2013.01); *H04L 63/0435* (2013.01); *H04L 63/068* (2013.01)

(58) Field of Classification Search
CPC ..... H04L 9/32; H04L 63/068; H04L 63/0435; H04L 9/0861; H04L 9/14; H04L 9/16; H04L 9/0847
See application file for complete search history.

(56) References Cited

U.S. PATENT DOCUMENTS

| | | | |
|---|---|---|---|
| 5,875,329 A | 2/1999 | Shan | |
| 8,046,490 B1 * | 10/2011 | Wu | .......... H04L 45/00 370/351 |
| 8,862,871 B2 | 10/2014 | Ramanujan | |

(Continued)

OTHER PUBLICATIONS

Boneh, D. et al., "Identity-Based Encryption from the Weil Pairing", in SIAM J. of Computing, 2003, pp. 586-615, vol. 32, No. 3.

(Continued)

*Primary Examiner* — Mahfuzur Rahman
(74) *Attorney, Agent, or Firm* — Carlson, Caspers, Vandenburgh & Lindquist, P.A.

(57) ABSTRACT

Methods, networks and nodes for dynamically establishing encrypted communications between a first node having a first identification and a first private key and a second node having a second identification and a second private key. A first signal comprising information indicative of the first identification of the first node is transmitted, then, upon receipt of the first signal by the second node, a second signal comprising information indicative of the second identification of the second node and a first portion of a symmetric key is transmitted, then, upon receipt of the second signal by the first node, a third signal comprising a second portion of the symmetric key is transmitted.

20 Claims, 4 Drawing Sheets

(56) References Cited

U.S. PATENT DOCUMENTS

| | | | |
|---|---|---|---|
| 2002/0176399 A1* | 11/2002 | Wilmer | H04L 45/00 370/349 |
| 2005/0027989 A1 | 2/2005 | Sandhu et al. | |
| 2007/0157309 A1 | 7/2007 | Bin et al. | |
| 2008/0028211 A1 | 1/2008 | Tanizawa et al. | |
| 2008/0046898 A1 | 2/2008 | Molina et al. | |
| 2009/0240944 A1* | 9/2009 | Cho | H04L 63/068 713/175 |
| 2011/0055567 A1* | 3/2011 | Sundaram | H04L 9/0825 713/169 |

OTHER PUBLICATIONS

Datko, Joshua B., "Supporting Secure, Ad Hoc Joins for Tactical Networks", Unites States Naval Academy, 2002, pp. 1-86.

Kent, S. et al., "Secure Border Gateway Protocol (S-BGP)", IEEE Journal on Selected areas in Communications, Apr. 2000, pp. 582-592, vol. 18, No. 4.

Murphy, S. et al., "Digital Signature Protection of the OSPF Routing Protocol", in IEEE Proceedings of the Symposium on Network and Distributed System Security, Feb. 1996, pp. 1-10, US.

National Security Agency, "Elliptic Curve Cryptography Groups IPMEIR IS", Version 1, May 2010, pp. 1-7, US.

Pizzi, Steven V., "A Routing Architecture for the Airborne Network", The MITRE Corporation, IEEE 2007, pp. 1-7.

U.S. Patent and Trademark Office, "Examiner's Answer to Appeal Brief", U.S. Appl. No. 13/283,162, dated May 7, 2014, pp. 1-15.

U.S. Patent and Trademark Office, "Office Action", U.S. Appl. No. 13/283,162, dated Mar. 21, 2013, pp. 1-14.

U.S. Patent and Trademark Office, "Office Action", U.S. Appl. No. 13/283,162, dated Oct. 10, 2013, pp. 1-17.

U.S. Patent and Trademark Office, "Patent Board Decision", U.S. Appl. No. 13/283,162, dated May 25, 2016, pp. 1-8.

Wan, T. et al., "Pretty Secure BGP (psBGP)", in Proceedings of the 12th Annual Network and Distributed System Security Symposium (NDSS '05), Feb. 2005, pp. 1-23.

White, R., "Securing BGP Through Secure Origin BGP (soBGP)," Business Communications Review, May 2003, pp. 47-53.

Morotz, R. et al., "Organically Assured Routing System (OARS)", OARS Final Technical Report, Jun. 2011, pp. 1-27, US.

* cited by examiner

METHODS, NETWORKS AND NODES FOR DYNAMICALLY ESTABLISHING ENCRYPTED COMMUNICATIONS

RELATED APPLICATION

This application claims priority to and is a continuation of U.S. patent application Ser. No. 13/283,162 filed Oct. 27, 2011, entitled "Methods, Networks And Nodes For Dynamically Establishing Encrypted Communications," which is herein incorporated by reference.

STATEMENT REGARDING FEDERALLY SPONSORED RESEARCH OR DEVELOPMENT

This invention was made with government support under contract FA8750-09-C-0166 awarded by the U.S. Air Force/Air Force Material Command (AFMC)/Air Force Research Laboratory (AFRL). The government has certain rights in the invention.

FIELD

This disclosure relates to methods, networks and nodes for establishing communication between nodes and, more particularly, to such methods, networks and nodes dynamically establishing encrypted communications between nodes.

BACKGROUND

Communication networks are well known in the art. Multiple nodes may be incorporated into a common communication system for the purposes of exchanging data of various kinds. Such networks may exist for myriad purposes and incorporate anywhere from two nodes to millions of nodes. While many such networks are relatively static in location and composition, networks are increasingly physically mobile and rapidly variable in composition. Thus, while many conventionally wired networks do not pose substantial challenges in maintaining the integrity of the network even when nodes move about and enter and leave the network, managing mobile networks while also maintaining the security of the network may create relatively greater challenges in supporting the network.

Contemporary standard networking protocols, such as Open Shortest Path First (OSPF) and Border Gateway Protocol (BGP), were originally designed for largely static, terrestrial networks. As such, they incorporate conventional security mechanisms to combat conventional static, terrestrial network security problems. Such security mechanisms tend to rely on static information, reliable fast network connections, and, in various cases, a reliable connection to a key management server. In such networking protocols, network administrators may manually configure the security for each router link, which may be time consuming, complicated and not practical for a mobile network. Certain security protocols may utilize signed certificates for message authentication, which again may be impractical in circumstances where connections are not as fast, reliable or provide as much or sufficient bandwidth as terrestrial networks.

Such problems may be magnified in the event the network in question is an airborne network or otherwise non-terrestrial. In such networks, the relative speed of each node may cause the composition of the network and links between nodes to change with relatively high frequency. While OSPF and BGP may function to operate such a non-terrestrial network, security with such protocols in an environment with fast-changing network membership and links may be unacceptably easy to compromise or otherwise vulnerable. In such a non-terrestrial network, sub-networks, and particularly those on the spatial fringe of the network, may have one or more attributes that hamper the operation of existing routing security systems, including bandwidth constrained wireless links, mobile ad hoc network operation, and intermittent connectivity with the global information grid (GIG) backbone network.

Various specific types of routing protocols such as OSPF and BGP, such as digital signature based OSPF, S-BGP, and soBGP, employ digital certificates for message authentication and rely on a public key infrastructure for encryption key management, such as key updates and key revocation. The bulkiness of digital certificates may make such an approach impractical for the bandwidth-constrained wireless subnets of a non-terrestrial network. Furthermore, intermittent disconnections of a non-terrestrial subnet from a backbone of the network of the global information grid may make the certificate servers temporarily or permanently inaccessible, thereby hindering the operation of the key management mechanism. Finally, access to the Public Key Infrastructure (PKI) services by the routing system typically assumes correct functioning of the routing function to route packets to and from the network PKI servers.

SUMMARY

A network with a networking protocol has been developed which may improve network connectivity and reduce communications outages relative to conventional networking protocols in networks with mobile nodes. In various embodiments, the network protocol incorporates functionality such as dynamic discovery mechanism to automatically and with relatively quick response time discover and incorporate new nodes into the network. The network protocol may further incorporate proactive link monitoring between nodes to regularly and rapidly assess the state of the network links. In additional embodiments, the protocol may further incorporate a mobility index of nodes within the network to provide the network an ability to anticipate movement of nodes within and outside of the network and plan interaction within the network accordingly.

As a consequence of these features, a network having mobile nodes may be actively managed so as to provide networking capabilities on local, direct communication links. By providing for dynamic discovery, nodes may enter the network rapidly. By monitoring links, broken links may result in a rerouting of the network and the deletion of absent nodes. By providing a mobility index, links within the network may be established in a manner that is mindful of a likelihood of a link to be present in the future.

In so doing, military applications in particular may be strengthened relative to existing networks. In various mobile military networks, the advantages of networking may be maintained while keeping links direct and relatively secure. In a highly mobile environment, nodes may enter and leave the network with relative seamlessness and minimal disruption, either to the node's operation or the operation of the network in general. Such benefits may be felt particularly in aerial networks, where fast-moving military aircraft maneuvering aggressively may place unique stress on network management.

In an embodiment, a method dynamically establishes encrypted communications between a first node having a first identification and a first private key and a second node having a second identification and a second private key. A first signal comprising information indicative of the first identification of the first node is transmitted, then, upon receipt of the first signal by the second node, a second signal comprising information indicative of the second identification of the second node and a first portion of a symmetric key is transmitted, then, upon receipt of the second signal by the first node, a third signal comprising a second portion of the symmetric key is transmitted.

In an embodiment, at least one of the second signal and the third signal is encrypted.

In an embodiment, the at least one of the second signal and the third signal are encrypted according to at least one of the first portion of the symmetric key and the second portion of second symmetric key.

In an embodiment, the first private key and the second private key are based, at least in part, on time.

In an embodiment, the first portion of the symmetric key is generated with the second node, after the transmitting the first signal step, based, at least in part, on the information indicative of the first identification of the first node and the second private key, and the second portion of the symmetric key is generated with the first node, after the transmitting the second signal step, based, at least in part, on the information indicative of the second identification of the second node and the first private key.

In an embodiment, the first node comprises a first processor and the second node comprises a second processor, the first processor and the second processor are trusted hardware, and the generating with the second node step is software implemented on the second processor and the generating with the first node step is software implemented with the second processor.

In an embodiment, the first processor and the second processor implement a software scheme having a plurality of software layers, and wherein the generating with the second node step and the generating with the first node steps are software implemented as one of the plurality of software layers.

In an embodiment, the first node comprises a first processor and the second node comprises a second processor, at least one of the first processor and the second processor is untrusted hardware and, if the first processor is untrusted, the generating with the first node step is performed with a first hardware module coupled to the first node and otherwise the generating with the first node step is performed with the first processor, and, if the second processor is untrusted, the generating with the second node step is performed with a second hardware module coupled to the second node and otherwise the generating with the second node step is performed with the second processor.

In an embodiment, each of the transmitting steps transmits only one data packet apiece.

In an embodiment, at least one of the first identification and the second identification is an internet protocol address of the first node and an internet protocol address of the second node, respectively.

In an embodiment, at least the transmitting the first signal step is a multicast signal to at least the second node and a third node different than the first node and the second node.

In an embodiment, the first step is returned to upon completion of the transmitting the third signal.

In an embodiment, the step of returning to the transmitting the first signal step refreshes the symmetric key.

In an embodiment, the step of returning to the transmitting the first signal step occurs periodically.

In an embodiment, the symmetric key has an expiration time and wherein the returning step occurs after the expiration time.

In an embodiment, the first private key is the same as the second private key.

In an embodiment, the first private key is different than the second private key.

In an embodiment, dynamically configured encrypted network has a first node having a first identification and a first private key and a second node communicatively coupled to the first node and having a second identification and a second private key. The first node is configured to transmit a first signal comprising information indicative of the first identification of the first node, the second node is configured to transmit, upon receipt of the first signal by the second node, a second signal comprising information indicative of the second identification of the second node and a first portion of a symmetric key and the first node is configured to transmit, upon receipt of the second signal, a third signal comprising a second portion of the symmetric key.

In an embodiment, a node configured to dynamically establish encrypted communication with a second node having a second identification and a second private key has a first identification different from the second identification and a first private key different from the second private key and a transceiver. The transceiver is configured to transmit a first signal comprising information indicative of the first identification of the first node, receive a second signal, transmitted by the second node upon receipt of the first signal, comprising information indicative of the second identification of the second node and a first portion of a symmetric key and transmit, upon receipt of the second signal, a third signal comprising a second portion of the symmetric key.

FIGURES

DESCRIPTION

Figure 1:
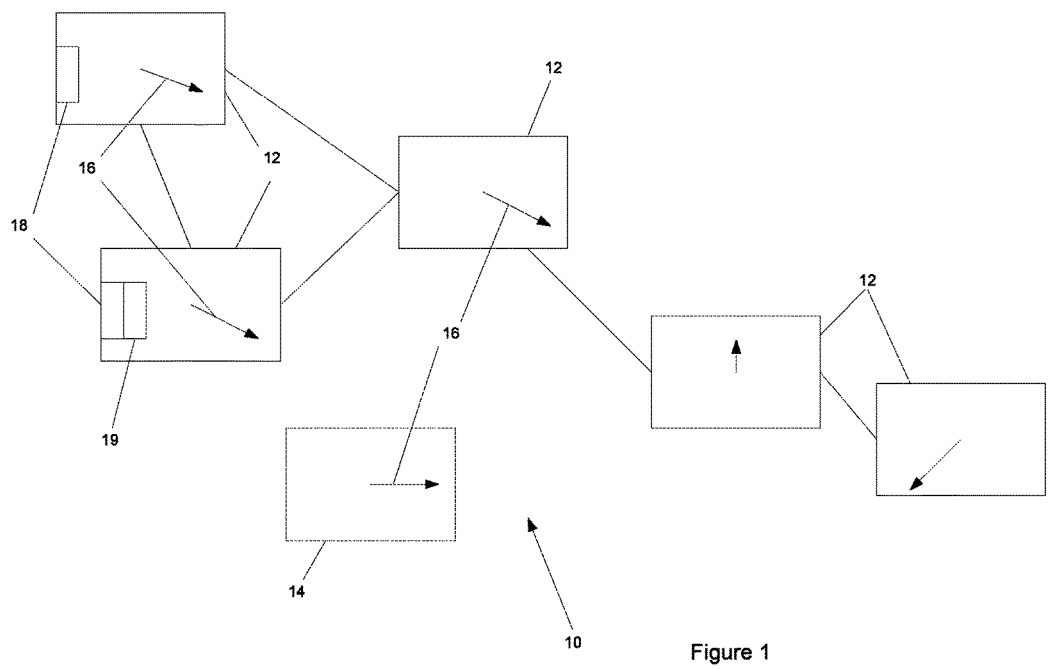
FIG. 1 is a block diagram of a network.

FIG. 1 is an exemplary mobile network 10. In various embodiments, network 10 is airborne or otherwise non-terrestrial. Individual nodes 12 of network 10 represent in various embodiments vehicles such as aircraft or space vehicles equipped with networking equipment. In certain embodiments, a single vehicle may incorporate multiple nodes 12. In such embodiments, the nodes 12 of a single vehicle may act independently within the scope of network 10, or may be joined to functionally perform as a single node. Such nodes 12 are equipped with conventional networking equipment as is well known in the art and which may be developed in the future, including wireless networking equipment to transmit and receive networking communications.

Owing to the mobile nature of network 10, nodes 14 not already a part of network 10 may joint network 10 as appropriate. In addition, certain nodes 12 may leave network 10. The reasons for nodes 12, 14 entering and leaving network 10 may be functional, i.e., the nodes' 12, 14 presence in network 10 is or is no longer needed or desired. In various embodiment, however, the entry or exit of nodes 12, 14 in network 10 may owe to geo-spatial reasons, i.e., node 12, 14 is or is not within effective range of the network, either because effective network communication is impossible or impractical due to range, or because node 12, 14, while being physically capable of communicating with network 10, is inside or outside of a range at which effective coordination with other nodes 12 of network 10 becomes impractical.

As illustrated, nodes 12, 14 have vectors 16 representing a speed and direction of motion of node 12, 14. Thus, while certain nodes 12 have vectors 16 representing similar speeds and directions of movement, and thus will tend to maintain relative position with respect to one another, other nodes 12, 14 have vectors 16 representing speeds and directions of movement which are contrary to vectors 16 of other nodes 12, and thus will tend to change their position relative to other nodes 12.

As indicated above, nodes 12 incorporate conventional networking hardware as known in the art or which may be developed in the future. Nodes 12 variably also incorporate computer processing hardware and software 18 for general node management as well as for conducting networking operations. In various embodiments, certain nodes 12 have processor 18 while others do not, though in various embodiments at least some nodes 12 in network 10 incorporate processor 18.

As illustrated, various nodes 12 are configured with a communication link 19 to other nodes 12 of network 10. In various embodiments, some or all of nodes 12 incorporate links 19 to each other node 12 in network 10. However, particularly in embodiments where links 19 are of relatively limited spatial scope and nodes 12 are relatively spread apart, not all nodes 12 may have a link 19 to each other node 12. In such embodiments, nodes 12 may nevertheless communicate with other nodes 12 of network 10 even without a direct link 19 by conducting multi-hop communications as well known in the art or which may be developed in the future.

In various embodiments, processor 18 incorporates software configured for routers running on trusted systems. In various applications, particularly those where the network administration has an ability to control the specifications of node 12 hardware, such as processor 18, and user access to such hardware, the hardware may be deemed trusted and thus of particular ongoing network access reliability.

In an embodiment, software for processor 18 includes a key distribution server, a key negotiation protocol and a device driver (20, FIG. 2, below). The key distribution server may be software that operates on one processor 18 for the benefit of multiple nodes 12 though not necessarily all nodes 12 of network 10. Key distribution may be centralized. In general, such preloading private encryption keys is conventional and well known in the art such as by loading such private encryption keys into each node 12 either wirelessly or by physical connection. It is noted that in certain circumstances it may be impractical or impossible to update encryption keys for network 10 after beginning operation of network 10, such as when aircraft of network 10 takes off or otherwise becomes separate from their ground support systems.

In an embodiment, a key negotiation protocol periodically sends out multicast messages searching for neighboring nodes 12. In an ad hoc network environment where the layout of network 10 is dynamic, nodes 12 may regularly or irregularly converge and/or diverge. The key negotiation protocol may operate to detect when two nodes 12 are within communication range of one another. The key negotiation protocol may then used by neighboring nodes 12 to set-up and maintain a security association during connection. The neighboring nodes 12 may be configured to authenticate each other and verify that nodes 12 are allowed to communicate with one another. The key negotiation protocol may then be used build an encryption tunnel or other communication scheme well known in the art or to be developed in the future through which the routing protocol messages are sent.

In various embodiments, identity-based encryption (IBE) may be utilized to authenticate nodes 12 and set-up symmetric communication that may be used to encrypt and sign routing messages. In an embodiment, the key negotiation protocol uses identity-based encryption to authenticate nodes 12 and to negotiate a symmetric key for use in further communication in an encrypted tunnel or other communication scheme known in the art. Identity-based encryption may utilize reduced bandwidth overhead in comparison to other communication schemes typically used in the art to share public keys, though various circumstances may make alternative schemes as is well known in the art or which may be developed in the future more viable. In various embodiments, pre-stored public keys may not be necessary. Periodically, neighboring nodes 12 may use a key exchange protocol to negotiate a new symmetric key for an existing encrypted tunnel in order to increase the difficulty for an outside attacker to break the encryption scheme.

The software may include or may consist entirely as a device driver (32, FIG. 2, below) residing on processor 18. In certain embodiments, the device driver resides in kernel 24 of the operating system of processor 18. In such embodiments, kernel 24 may be added to the operating system as a module that is loaded when the operating system starts up.

In an embodiment, processor 18 is trusted hardware. For purposes herein, trusted hardware means hardware that is manufactured and/or certified and/or verified to be operable under the methods described herein or which may otherwise be trusted to follow network rules as described herein. In an embodiment, trusted hardware meets the Trusted Computer System Evaluation Criteria, DoD 5200.28-STD, Dec. 26, 1985, also known in the art as the "Orange Book", promulgated by the United States Department of Defense. Additional governmental or commercial standards may be utilized in lieu of or in addition to the Orange Book, as well as versions of the Orange Book and other standards which have been promulgated in the past and which may be developed in the future. Such manufacture, certification and/or verification may be accomplished, for example, by a manufacturer, assembler, configurer and/or controller of the network operating in accordance with features and/or techniques described herein. This typically means that such trusted hardware is either (1) manufactured or configured to operate in accordance with features and/or techniques described herein, and not subsequently modified in a way which would compromise the security set forth herein; or (2) verified to operate in accordance with features and/or techniques described herein, e.g., verified by an independent trusted verifier or verification group, such Verisign for example. In an embodiment, (1) manufacture of trusted hardware is controlled to operate within predetermined standards, particularly, predetermined security standards; plus (2) such manufactured trusted hardware would be rendered either (a) inoperable if modified in such a way as to defeat such predetermined standards, or (b) any modifications which would defeat such predetermined standards would be known or could be determined by network or its operator, controller or user. In case of such a modification, such hardware would be classified or reclassified as untrusted hardware.

Trusted hardware may be made to particular specifications of a manufacturer, configurer, controller and/or user of network 10 and be made either by the manufacturer, assembler, configurer, controller and/or user of network 10 or a contract manufacturer which is itself considered trustworthy by the manufacturer, assembler, configurer, controller and/or user and, thus, can be certified to be trustworthy. Hardware that is untrusted, by contrast means hardware that does not have or cannot obtain such certification and/or verification and which, under certain circumstances, may have been manufactured or may have been modified to defeat certain protection or protections of the methods, networks and nodes described herein. Such untrusted hardware may include commercially available, off-the-shelf hardware or hardware otherwise provided to the user of network 10 by a source or manufacturer not considered or otherwise certified as being reliable.

In various embodiments, the device driver is configured to intercept packets between network 10 and routing software 28 on processor 18. In certain embodiments, the device driver manages all network communication between nodes 12 of network 10. In so doing, the device driver may protect route protocol messages regardless of what routing software is used. The device driver may be invisible to the routing software, thereby allowing network 10 to maintain a secure environment without respect to the routing software used and without need for nodes 12 to modify or change the routing software used by such nodes 12.

In various embodiments, network 10 incorporates router security module 19. Router security module 19 may be utilized where processor 18 is not trusted hardware and may be unnecessary when processor 18 is trusted hardware. As illustrated, router security module 19 is a separate hardware component. In an embodiment, the router security module may be software configured to operate on untrusted processor 18 or other untrusted hardware configured to run software, such as other processors, microcontrollers and the like which may be components of node 12. Alternatively, the router security module can be integrated with the router software though an application provider interface (API) or may be run on an external, conventional processor 18 that is connected to the network 10 through an interface such as conventional wireless links utilized between nodes 12 of network 10.

Routing protocol implementations such as Open Shortest Path First (OSPF) and Border Gateway Protocol (BGP) may be incorporated in router security module 19. In various embodiments, router security module 19 may be configured to provide multiple levels of protection for network 10. In an embodiment, a first level of protection is a route protocol monitor to seek to protect network 10 from false routing messages. A second level may be provided when a network administrator is concerned about node 12 exfiltration and the compromise of a routing database.

In an embodiment, router security module 19 protects network 10 by running implementations of the routing protocols. Since router security module 19 is, in various embodiments, running the same routing protocol implementations as processor 18, the router security module can verify the route information, thereby allowing router security module 19, and network 10 generally, to detect when a node 12 is acting contrary to the interests of users of network 10 either through error or malicious activity.

In certain embodiments, router security module 19 is configured to remove routing algorithms from processor 18 to protect network 10 from an unauthorized access of information on network 10 or an attempt to compromise or otherwise remove a particular node 12 or nodes 12 from network 10 without proper authorization, also known in the art as exfiltration. Exfiltration may occur when node 12 is compromised and a route database and/or other routing algorithms of nodes 12 of network 10 is used by an attacker to create a network map of network 10 or otherwise obtain information as to the content and routing of network 10. If the routing algorithms included in processor 18 are accessed, modified and reinserted into a processor 18 of network 10, in an exemplary embodiment with one node 12 removed from the routing algorithms, the removed node 12 may be ignored by some or all of the rest of network 10, effectively allowing an attacker to remove nodes 12 from network 10. In an embodiment, router security module 19 is configured to maintain secure routing algorithms independent of processor 18. In the event of an exfiltration attack, router security module 19 may restore proper routing algorithms to processor 18.

A compromised node 12 may permit falsification of routing information exchanged between nodes 12 so as to disrupt routing services of network 10 and permit exfiltration of network information. Commercial-grade nodes 12, such as conventional off-the-shelf commercial routers, may be particularly vulnerable to being compromised through exploits and malicious software that could harm network routing operations.

In an embodiment, network 10 uses identity-based encryption (IBE) algorithms to authenticate routing or control plane messages. Network 10 may also be configured to remove a need for a centralized server for encryption and authentication. Identity-based encryption is based on elliptical curve cryptography and operates similar to public key cryptography, as is well known in the art. In various embodiments, the functional difference is that identity-based encryption uses an entity's identification for its public key. In an exemplary embodiment, the public key of an individual node 12 is that individual node's 12 IP address. If an origination node 12 sends a message to another node, a destination node 12, origination node 12 could use identity-based encryption to encrypt the message using the destination node's 12 IP address. When the destination node 12 receives the message, destination node 12 may use a private key of destination node 12 to decrypt the message. Likewise, origination node 12 may sign the message using a private key and destination node 12 may then use the source IP address of the packet to verify the message. Using identity-based encryption may reduce or obviate a need for a centralized key server to verify a router or the need to transmit long certificates, as is well know and conventionally used in the art.

As an intermediate node 12 receives routing messages from an origination node 12, intermediate node 12 updates a routing database and then securely sends the message to destination nodes 12. In various embodiments, intermediate nodes 12 authenticate the message before add the routing information to intermediate nodes 12 databases and sending the message to the destination node 12. In various embodiments, the routing database is distributed throughout network 10. In such embodiments, since nodes 12 of network 10 incorporate the same routing database and are also running Open Shortest Path First (OSPF) and/or Border Gateway Protocol (BGP), nodes 12 of network 10 may confirm what routing messages a transmitting node 12 should or would be expected to send if the transmitting node is functioning properly. If the routing messages sent by transmitting node 12 are contrary to expectation then transmitting node 12 (or its protocol implementations) may not be operating correctly. The transmitting node 12 may be quarantined from the rest of network 10 and administrators notified.

As described above, Open Shortest Path First (OSPF) and Border Gateway Protocol (BGP) is executed in a distributed manner, i.e., each processor 18 of each node 12 performing routing and network management functions. In an alternative or supplemental embodiment, Open Shortest Path First (OSPF) and Border Gateway Protocol (BGP) implementations are switched off in multiple processors 18 of network 10 or are not included at all on in several processors 18. In such an embodiment all route protocol functions are performed in a single, centralized processor 18 or otherwise on a single node 12 of network 10 which also stores the routing database. As centralized processor 18 receives routing updates, it may update its local router's next hop tables so that network 10 in general routes data correctly. In the event that a node 12 becomes compromised or begins operating incorrectly, centralized processor 18 may detect such behavior and prevent bad routing information from being distributed to the rest of network 10.

In various embodiments, when two nodes 12 initiate a connection with each other, network 10 is configured to use identity-based encryption to authenticate nodes 12 and set-up a shared symmetric key that nodes 12 may use for an encrypted tunnel or other suitable communication scheme known in the art. In an embodiment, a centralized processor 18 or distributed processors 18 provide such authentication. As such, while network 10 may utilize an organic key management system without a centralized server, network may, as noted above, utilize a centralized key distribution server to initialize nodes' 12 private keys before use. In various embodiments, private keys contain an expiration time that causes the private keys to be invalid after the specified time.

In various embodiments, the key distribution server is configured to preload nodes 12 with a list of its private keys that nodes 12 may use over time. In such embodiments, each key in the list is only valid for a predetermined amount of time. The resolution of the key expiration is, in various embodiments, as small as or smaller than one minute or as large as valid for an entire duration of network 10. In various embodiments, the private keys are valid from one to fifteen minutes. In an exemplary embodiment, if origination node 12 wishes to encrypt a message so that only destination node 12 can read the message, origination node 12 may use destination node's 12 identity, such as destination node's 12 IP address and a key expiration time. The private key expiration time may be known to origination node 12 since the origination node 12 may notify destination node what the key expiration time period is. In various embodiments, every node 12 of network 10 have synced system clocks, in an embodiment based on the Global Positioning System or other generally available timing system, in part for the purpose of coordinating private key expiration times.

Private keys may be protected utilizing processor 18 if processor 18 is trusted hardware. If processor 18 is not trusted, the private keys can be stored in a separate partition of an operating system of processor 18. Firewalls and memory management techniques can be used to protect the keys as is well known in the art. In addition, the private keys may be stored on a partition in a trusted operating system. Further, the private keys may be stored within a trusted crypto card as known in the art.

In an embodiment, router security module 19 may be configured to protect untrusted nodes 12 and network 10 in general from non-conforming nodes 12. Router security module 19 may be utilized if a node 12 is running routing protocol algorithms. In an embodiment, router security module 19 is located in each node 12 configured to run network 10 software on local processor 18. Router security module 19 may be configured to check routing packets going to and coming from the resident node 12 by checking to see if the routing packet contains false information.

Router security module 19 may be able to detect false information by itself by running an implementation of Open Shortest Path First (OSPF) and Border Gateway Protocol (BGP). Router security module 19 may also incorporate a routing database that is a copy of a routing database kept on processor 18. As nodes send Open Shortest Path First (OSPF) and Border Gateway Protocol (BGP) messages, router security module 19 may compare those messages against what router security module 18 thinks a transmitting node 12 should be sending. If router security module 19 detects transmitting node 12 is trying to send false information, router security module 19 may quarantine the packet and notify a network administrator of the anomaly. In this way, network 10 may be protected against false information.

Figure 2:
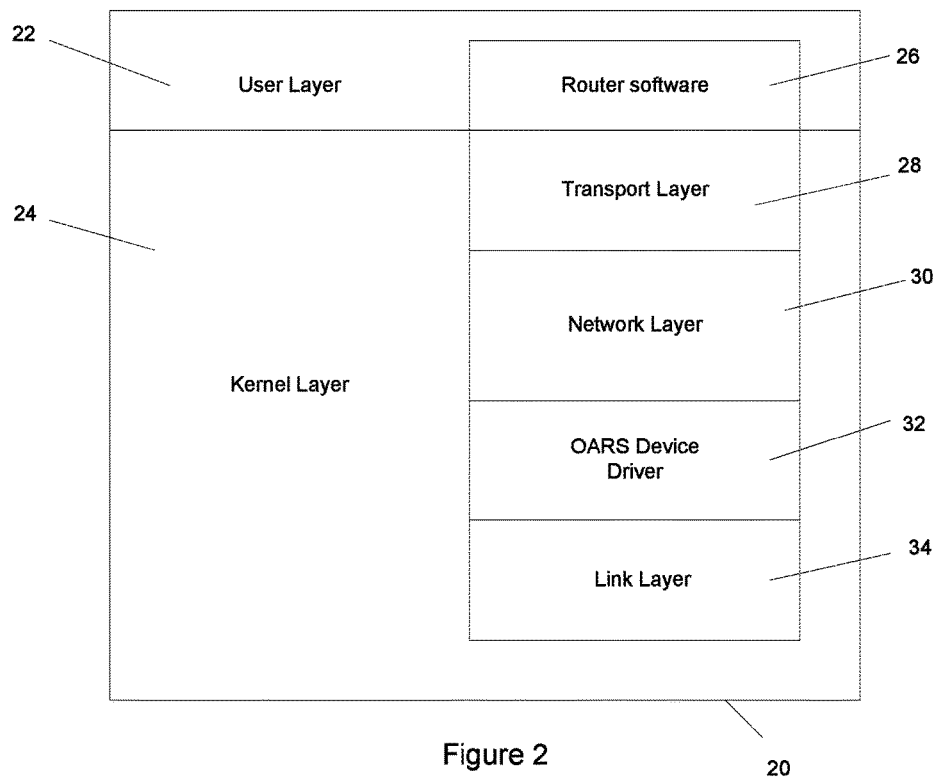
FIG. 2 is a network stack for the network of FIG. 1.
Figure 3:
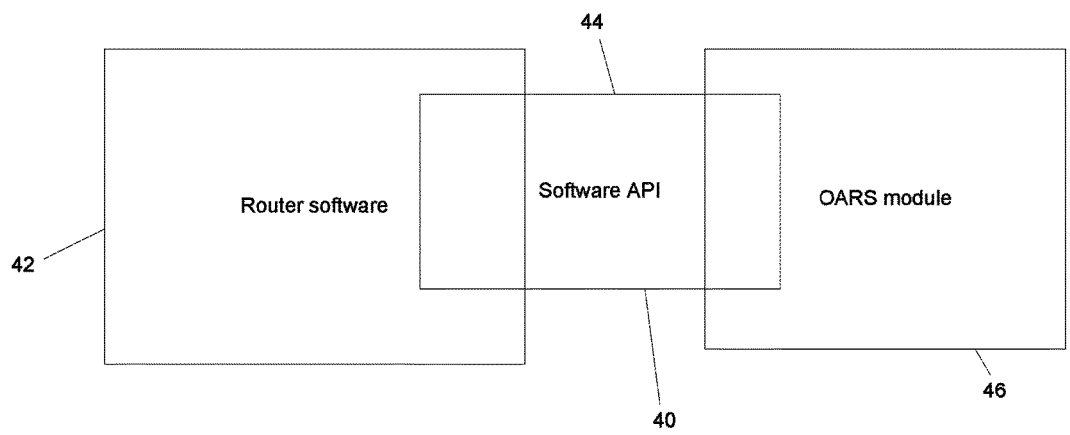
FIG. 3 is an application provider interface for router hardware.
Figure 4:
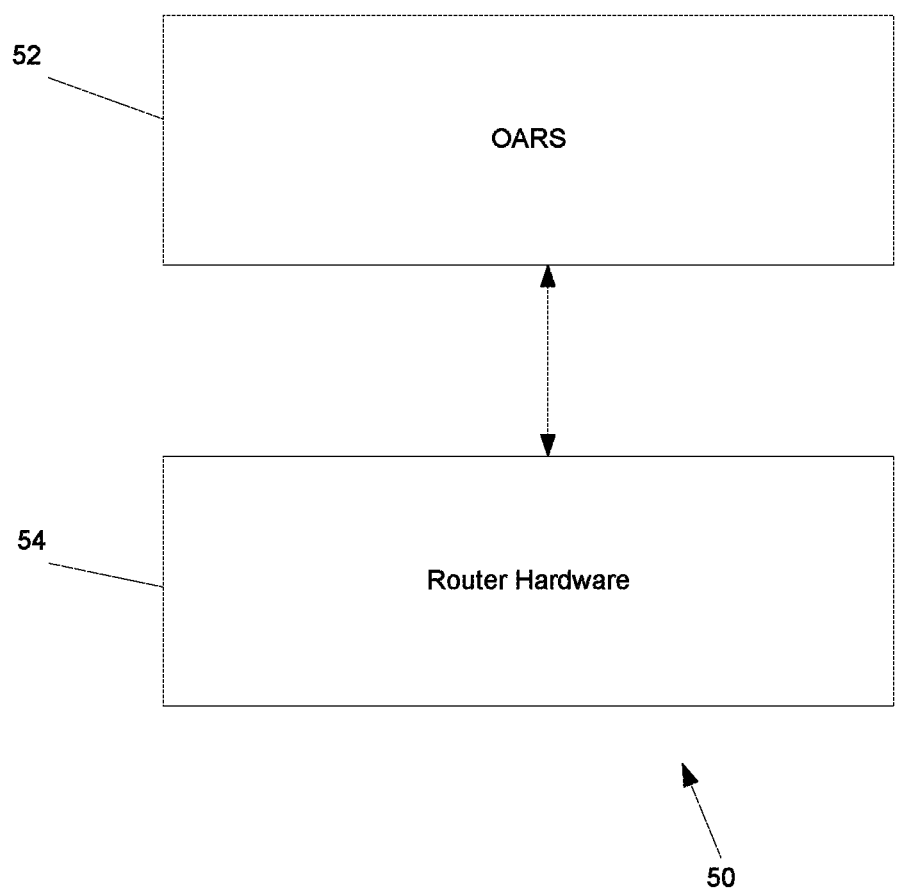
FIG. 4 is a closed-system hardware implementation of a organically assured routing system.

FIGS. 2-4 illustrate various hardware and software implementations of security structures of network 10. FIG. 2 is network stack 20 as may be operated on processor 18 of node 12. Network stack 20 incorporates user layer 22 and kernel layer 24. Router software 26 is visible to a user on user layer 22. Transport layer 28 controls routing functionality while network layer 30 manages network functionality. Organically Assured Routing System (OARS) device driver 32, as described above in particular with respect to embodiments of router security module 19 implemented as software run on processor 18, manages the flow of packets between route protocols and network 10 while maintaining the organic ability of network 10 to incorporate and drop nodes 12 from network 10 as nodes 12 enter or leave an effective range of network 10. OARS device driver exists in both in user layer 22 and kernel layer 24. Link layer 34 manages transmission of packets over network 10. In embodiments where a network administrator has access to nodes' 12 hardware and operating system but not routing software, OARS device driver 32 implementation can be utilized. In an exemplary embodiment, OARS device driver 32 is proprietary routing software running on a Linux operating system, where OARS device driver 32 is installed in network stack 20 of the Linux kernel. In various embodiments, packets travelling between router software 26 and network 10 can be intercepted by OARS device driver 32.

FIG. 3 is an illustration of an application provider interface application 40 to interface with conventional router software 42 as run on processor 18. If access to node's 12 router software 42 is available, OARS software application provider interface (API) 44 may be utilized to bridge router software 42 to OARS module 46 as operated on a separate, hardware-implemented embodiment of router security module 19. Software API 44 may be configured to allow router software 42 to integrate OARS module 46 directly into router software 42. FIG. 3 thus stands in contrast to the embodiment of FIG. 2 in that router security module 19 functions as part of a separate OARS hardware module 46 mechanically and logically isolated from general router software 42 of processor 18 in FIG. 3, while FIG. 2 integrates router security module 19 directly into processor 18 by way of OARS device driver 32.

FIG. 4 is an illustration of closed-system software implementation 50 for use with untrusted hardware, such as embodiments where processor 18 is untrusted. If node 12 is a closed system where access to router hardware or software 54 is impractical or impossible, OARS external hardware plug-in 52 is installed on processor 18 or other computing device coupled to the router. OARS external hardware plug-in 52 is configured to transmit routing commands to router hardware 54 so that router hardware 54 directs routing messages through OARS external hardware plug-in 52 so that routing message may be properly managed in network 10 as described in detail above.

Figure 5:
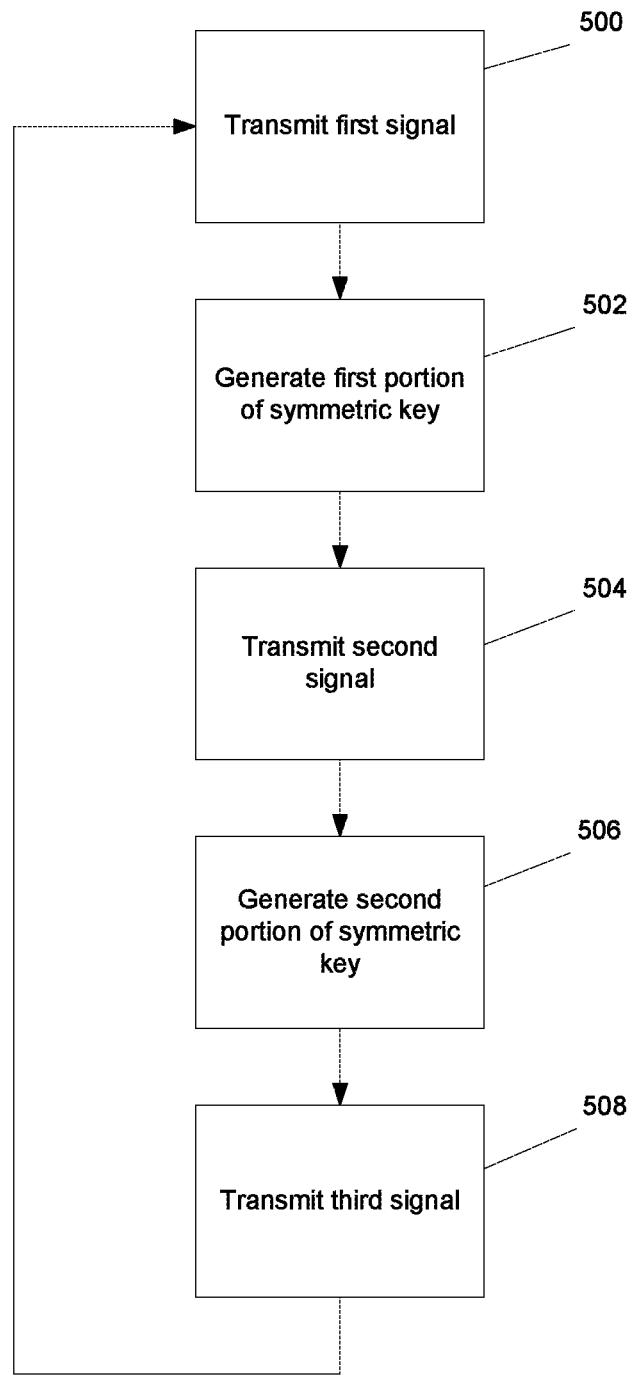
FIG. 5 is a flowchart for creating an organically assured network.

FIG. 5 is a flowchart for providing organically assured network routing in network 10. A first signal is transmitted (500) from a first node 12 of network 10. In an embodiment, the identification includes an identity-based encryption identifier, such as information indicative of the identification of the first node 12. In various embodiments, a first portion of a symmetric key is generated (502) based on a first private key and the identification of the first node 12. In certain such embodiments, a second node 12 receives the first transmission and generates the first portion of the symmetric key. The second node 12 then transmits (504) a second signal having information indicative of the identification of the second node and the first portion of the second key. In various embodiments, the first node 12 receive the second transmission and generates (506) a second portion of the symmetric key using a private key and the information indicative of the identification of the second node. The first node 12 then transmits (508) a third signal containing the second portion of the symmetric key to the second node 12, whereupon the first and second nodes 12 may be configured to conduct secure communications using a tunnel or other communication schemes known in the art as described above. The process may periodically begin anew at (500) in order to refresh the symmetric key. The process may begin again based on an expiration time of the symmetric key.

While the above methodology may be implemented according to a Diffie-Hellman methodology as is well known in the art, alternative key exchanges as known in the art or which may be developed in the future may be utilized. Furthermore, where processor 18 of one node 12 is trusted and processor 18 of a different node 12 is not trusted, processing functions above may be performed on trusted processor 18. Alternatively, where not-trusted processor 18 may be made trusted through the implementation of OARS device driver 32 on processor 18 or OARS module 46 physically coupled to processor 18 as described with respect to FIGS. 3 and 4, for instance, not-trusted processor 18 may be utilized with trusted processor 18. In this way, nodes 12 may be added to or subtracted from network 10 organically and without a need to actively manage the membership of network 10 by an administrator.

Thus, various embodiments of the invention are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of establishing secure communications for control messages between routers in a communication network, the method comprising:

transmitting a first message from a first router, said first message including an Internet Protocol (IP) address of the first router;

upon receiving said first message at a second router, generating a first portion of a symmetric key and a second message including the first portion of the symmetric key;

signing the second message based on a preloaded first private key associated with said second router;

encrypting the second message using identity-based encryption with the IP address of the first router as the public key;

transmitting the second message from said second router, said second message including said first portion of said symmetric key and an IP address of the second router;

upon receiving said second message at said first router, generating a second portion of said symmetric key and a third message including the second portion of the symmetric key;

signing the third message based on a preloaded second private key associated with said first router;

encrypting the third message using identity-based encryption with the IP address of the second router as the public key;

transmitting the third message from said first router, said third message including said second portion of said symmetric key; and at the first and second routers, generating said symmetric key from said first portion of said symmetric key and said second portion of said symmetric key, said symmetric key being used by said first and second routers for subsequent secure communication of control messages therebetween.

2. The method of claim 1, further comprising:

preloading said first private key on said second router and said second private key on said first router.

3. The method of claim 2, wherein each of said first and second private keys are only valid for a predetermined amount of time.

4. The method of claim 3, wherein said preloaded first private key includes a list of first private keys that are to be used over time and said preloaded second private key includes a list of second private keys that are to be used over time.

5. The method of claim 3, further comprising:

generating a new symmetric key upon expiration of one of said first and second private keys.

6. The method of claim 1, further comprising:

checking control packets going to and coming from at least one of said first and second routers with a router security module; and detecting false information with said router security module.

7. The method of claim 6, wherein detecting false information with said router security module, further comprises:

running an implementation of a routing protocol; and comparing said implementation of said routing protocol by said router security module with an implementation of a routing protocol of at least one of said first and second routers.

8. The method of claim 6, wherein detecting false information with said router security module, further comprises:

comparing information in a copy of a routing database with information in a routing database of at least one of said first and second routers.

9. The method of claim 6, further comprising:
quarantining at least one routing packet of said routing packets upon detecting of said false information.

10. The method of claim 1, further comprising:
distributing a routing database to said first node and said second routers.

11. The method of claim 10, further comprising:
updating said routing database of at least one of said first router and second router when one of said first router and second router is designated as an intermediate node that is configured to pass a message on to a destination node.

12. A method of establishing secure communications between a plurality of nodes in a communication network, the method comprising:
preloading a list of private keys on each said node of said plurality of nodes, each private key only being valid for a predetermined amount of time;
transmitting, in a single packet, a first signal from a first node of said plurality of nodes, said first signal including first node identification information;
upon receiving said first signal at a second node of said plurality of nodes, generating a first portion of a symmetric key;
transmitting, in a single packet, a second signal from said second node, said second signal including said first portion of said symmetric key and second node identification information, wherein said first portion of said symmetric key is encrypted for decryption with a currently valid private key of said list of private keys on said first node;
upon receiving said second signal at said first node, generating a second portion of said symmetric key;
transmitting, in a single packet, a third signal from said first node, said third signal including said second portion of said symmetric key, wherein said second portion of said symmetric key is encrypted for decryption with a currently valid private key of said list of private keys on said second node; and
generating said symmetric key from said first portion of said symmetric key and said second portion of said symmetric key, said symmetric key being used by said first and second nodes for subsequent secure communications.

13. The method of claim 12, further comprising:
syncing clocks on each node of said plurality of nodes.

14. The method of claim 12, further comprising:
distributing a routing database to each of said nodes of said plurality of nodes.

15. The method of claim 14, further comprising:
updating said routing database of at least one of said first node and second node when one of said first node and said second node is designated as an intermediate node that is configured to pass a message on to a destination node.

16. The method of claim 12, further comprising:
running implementations of routing protocols with a router security module to verify route information being used by a node of said plurality of nodes is correct.

17. A router for use in a communication network comprising:
a hardware processor configured to control communication operations of said router based on a key negotiation protocol, said key negotiation protocol configured to detect when another router is within a communication range of said router and configured to set-up and maintain a security association for communications with said other router;
wherein said set up of said security association includes transmitting a first message from said router to said other router, said first message including first router identification information;
wherein said set up of said security association further includes upon receiving a second message with a first portion of a symmetric key from said other router in response to said first message:
decrypting said second message using a private key of said router;
verifying authenticity of said second message using identity-based cryptography to check a digital signature of the second message against a source identification of said second message;
generating a second portion of said symmetric key and a third message including said second portion of said symmetric key;
generating a digital signature for said third message based on said private key of said router;
encrypting said third message to generate an encrypted third message, wherein encrypting includes using identity-based encryption with identification information of said other router as the public key; and
transmitting the encrypted third message with digital signature from said router to said other router; and
wherein said set up of said security association includes generating a symmetric key from said first portion of said symmetric key and said second portion of said symmetric key, said symmetric key being used by said router and said other router for subsequent secure communication of control plane messages.

18. The router for use in a communication network of claim 17, further comprising:
a router security module configured to monitor for false routing messages.

19. The router for use in a communication network of claim 18, wherein said router security module is further configured to restore proper routing algorithms to said processor when false routing messages have been detected.

20. The router for use in a communication network of claim 17, wherein said processor is further configured to manage a flow of packets using routing protocols while maintaining an organic ability to incorporate and drop nodes from said communication network as said nodes enter or leave an effective range of said communication network.

* * * * *